US012254836B2

(12) United States Patent
Li et al.

(10) Patent No.: US 12,254,836 B2
(45) Date of Patent: Mar. 18, 2025

(54) DISPLAY SUBSTRATE, DISPLAY DEVICE AND DRIVING METHOD

(71) Applicants: Hefei BOE Joint Technology Co., Ltd., Anhui (CN); BOE TECHNOLOGY GROUP CO., LTD., Beijing (CN)

(72) Inventors: Yongqian Li, Beijing (CN); Can Yuan, Beijing (CN)

(73) Assignees: HEFEI BOE JOINT TECHNOLOGY CO., LTD., Hefei (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/781,268

(22) PCT Filed: Jul. 8, 2021

(86) PCT No.: PCT/CN2021/105231

§ 371 (c)(1),
(2) Date: May 31, 2022

(87) PCT Pub. No.: WO2023/279328

PCT Pub. Date: Jan. 12, 2023

(65) Prior Publication Data

US 2024/0185795 A1 Jun. 6, 2024

(51) Int. Cl.

*G09G 3/3266* (2016.01)
*G09G 3/3225* (2016.01)
*G09G 3/3291* (2016.01)

(52) U.S. Cl.

CPC ......... *G09G 3/3266* (2013.01); *G09G 3/3225* (2013.01); *G09G 3/3291* (2013.01)

(58) Field of Classification Search

CPC ... G09G 3/3266; G09G 3/3225; G09G 3/3291
See application file for complete search history.

(56) References Cited

U.S. PATENT DOCUMENTS

2011/0205220 A1 8/2011 Ota
2013/0314308 A1* 11/2013 Hsu ..................... G09G 3/3233 345/82

(Continued)

FOREIGN PATENT DOCUMENTS

CN 101989404 A 3/2011
CN 102163398 A 8/2011

(Continued)

*Primary Examiner* — Patrick N Edouard
*Assistant Examiner* — Joseph P Fox
(74) *Attorney, Agent, or Firm* — WHDA, LLP

(57) ABSTRACT

A display substrate and a display device are provided. The display substrate includes: a base substrate; a plurality of pixels; and a light emitting control line and a first power supply line which are electrically connected to a light emitting control circuit of the pixel. The light emitting control circuits of pixels located in two adjacent rows share the same light emitting control line. The light emitting control circuit includes a light emitting control transistor, the gate of the light-emitting control transistor is electrically connected to the light emitting control line, one of the first electrode and the second electrode of the light emitting control transistor is connected to the first power supply line, and the first power supply line extends in parallel to the light emitting control line.

7 Claims, 8 Drawing Sheets

(56) References Cited

U.S. PATENT DOCUMENTS

| | | | | |
|---|---|---|---|---|
| 2015/0187272 | A1 | 7/2015 | Kimura et al. | |
| 2016/0037156 | A1* | 2/2016 | Lee | G09G 3/003 348/51 |
| 2016/0155383 | A1 | 6/2016 | Chen | |
| 2016/0300532 | A1 | 10/2016 | Tan et al. | |
| 2017/0206839 | A1 | 7/2017 | Wu et al. | |
| 2018/0137818 | A1* | 5/2018 | Kim | G09G 3/2003 |
| 2021/0358394 | A1 | 11/2021 | Yamashita et al. | |
| 2021/0399072 | A1* | 12/2021 | Song | H10K 59/126 |
| 2022/0180816 | A1 | 6/2022 | Yuan et al. | |

FOREIGN PATENT DOCUMENTS

| | | | |
|---|---|---|---|
| CN | 103474024 | A | 12/2013 |
| CN | 104036724 | A | 9/2014 |
| CN | 106409225 | A | 2/2017 |
| CN | 108682366 | A | 10/2018 |
| CN | 109559679 | A | 4/2019 |
| CN | 111564140 | A | 8/2020 |
| CN | 111816123 | A | 10/2020 |
| JP | 2010-0128183 | A | 6/2010 |
| WO | 2020/071826 | A1 | 4/2020 |

* cited by examiner

DISPLAY SUBSTRATE, DISPLAY DEVICE AND DRIVING METHOD

CROSS-REFERENCE TO RELATED APPLICATION(S)

This application is a Section 371 National Stage Application of International Application No. PCT/CN2021/105231, filed on Jul. 8, 2021, entitled "DISPLAY SUBSTRATE, DISPLAY DEVICE AND DRIVING METHOD", which is incorporated herein by reference in its entirety.

TECHNICAL FIELD

The present disclosure relates to a field of display technology, and in particular to a display substrate, a display device and a driving method.

BACKGROUND

Organic light emitting display devices display images using organic light emitting diodes (OLED). An OLED includes an organic layer as a light emitting substance between an anode that injects holes and a cathode that injects electrons. Also, the OLED emits light by recombination of holes and electrons injected into the organic layer. At this time, the luminance of the light is determined by the amount of current flowing through the OLED. In addition, the organic light emitting display device does not need an additional backlight source due to its self-luminous characteristics, so that it can work with a faster response speed and lower power consumption. In the current OLED display device, the light emitting control lines or light emitting control circuits connected to different pixels are different, so a large number of light emitting control lines need to be arranged in the display substrate. This plurality of light emitting control lines will occupy a large area of the substrate, which is not conducive to the realization of high resolution.

The above information disclosed in this section is only for an understanding of the background of the inventive concepts of the present disclosure, and therefore it may contain information that does not form the prior art.

SUMMARY

In one aspect, a display substrate is provided, wherein the display substrate includes: a base substrate; a plurality of pixels located on the base substrate and arranged in an array, wherein the pixel includes a light emitting element and a pixel driving circuit for driving the light emitting element to emit light, and the pixel driving circuit includes a light emitting control circuit and a light emitting driving circuit: and a light emitting control line and a first power supply line located on the base substrate, wherein the light emitting control line and the first power supply line are electrically connected to the light emitting control circuit, the light emitting control line is configured to provide a light emitting control signal, and the first power supply line is configured to provide a first voltage, wherein the light emitting control circuits of pixels located in two adjacent rows share the same light emitting control line: and wherein the light emitting control circuit includes a light emitting control transistor having a gate, a first electrode and a second electrode, the gate of the light emitting control transistor is electrically connected to the light emitting control line, one of the first electrode and the second electrode of the light emitting control transistor is connected to the first power supply line, and the first power supply line extends in parallel to the light emitting control line.

According to some exemplary embodiments, two pixels located in two adjacent rows and the same column share the same light emitting control transistor.

According to some exemplary embodiments, pixels located in two adjacent rows share the same light emitting control transistor.

According to some exemplary embodiments, the display substrate further includes a scanning signal line and a data line located on the base substrate, wherein the scanning signal line is configured to provide a scan signal and the data line is configured to provide a data signal: wherein the light emitting driving circuit includes a switching transistor, a driving transistor and a capacitor, each of the switching transistor and the driving transistor has a gate, a first electrode and a second electrode, the gate of the switching transistor is connected to the scanning signal line, the first electrode of the switching transistor is connected to the data line, the second electrode of the switching transistor is connected to a first node: the gate of the driving transistor is connected to the first node, the first electrode of the driving transistor is connected to the other of the first electrode and the second electrode of the light emitting control transistor, the second electrode of the driving transistor is connected to a second node: the capacitor is connected between the first node and the second node: an anode of the light emitting element is connected to the second node.

According to some exemplary embodiments, for two pixels located in two adjacent rows and the same column and sharing the same light emitting control transistor, the light emitting driving circuit of one of the two pixels and the light emitting driving circuit of the other one of the two pixels are substantially axisymmetric to each other with respect to the light emitting control line connected to the same light emitting control transistor.

According to some exemplary embodiments, for two pixels located in two adjacent rows and the same column and sharing the same light emitting control transistor, the first electrode of the driving transistor of one of the two pixels is connected to the light emitting control transistor through a connecting line: wherein the orthographic projection of the connecting line on the base substrate intersects with the orthographic projection of the light emitting control line connected to the same light emitting control transistor on the base substrate.

According to some exemplary embodiments, the orthographic projection of the connecting line on the base substrate intersects with the orthographic projection of the first power supply line connected to the same light emitting control transistor on the base substrate.

According to some exemplary embodiments, for two pixels located in two adjacent rows and the same column and sharing the same light emitting control transistor, the shared light emitting control transistor is located between the light emitting driving circuits of the two pixels.

According to some exemplary embodiments, for two pixels located in two adjacent rows and the same column and sharing the same light emitting control transistor, both the light emitting control line and the first power supply line connected to the shared light emitting control transistor are located between the light emitting driving circuits of the two pixels.

According to some exemplary embodiments, for two adjacent rows of pixels sharing the same light emitting control transistor, the shared light emitting control transistor is located between the light emitting driving circuits of the two adjacent rows of pixels.

According to some exemplary embodiments, for two adjacent rows of pixels sharing the same light emitting control transistor, both the light emitting control line and the first power supply line connected to the shared light emitting control transistor are located between the light emitting driving circuits of the two adjacent rows of pixels.

According to some exemplary embodiments, for two adjacent rows of pixels sharing the same light emitting control transistor, the first electrodes of the driving transistors of one of the two adjacent rows are connected to the light emitting control transistor through a first connecting line, and the first electrodes of the driving transistors of the other one of the two adjacent rows are connected to the light emitting control transistor through a second connecting line: wherein the first connecting line includes a first portion and a second portion, the first portion of the first connecting line extends substantially in parallel to the second connecting line, and the second portion of the first connecting line extends substantially vertical with respect to the second connecting line.

According to some exemplary embodiments, the first electrodes of the driving transistors of the one of the two adjacent rows are connected together through the first portion of the first connecting line and are connected to the light emitting control transistor through the second portion of the first connecting line, and the first electrodes of the driving transistors of the other one of the two adjacent rows are connected together through the second connecting line.

According to some exemplary embodiments, the orthographic projection of the second portion of the first connecting line on the base substrate intersects with the orthographic projection of each of the light emitting control line and the first power supply line connected to the same light emitting control transistor on the base substrate.

According to some exemplary embodiments, when the first voltage at a high level and the light emitting control signal at a high level are applied to the plurality of pixels, the plurality of pixels are configured to emit light concurrently with each pixel emitting light at a brightness corresponding to a data signal pre-stored in the each pixel.

In another aspect, a display device including the display substrate as described above is provided.

In another aspect, a method for driving the display substrate as described above is provided, wherein the method includes:

- applying a first voltage, a scan signal, a light emitting control signal, and a data signal each having a voltage value of a specified level concurrently to a plurality of pixels, so as to reset the plurality of pixels;
- applying a first voltage, a scan signal, a light emitting control signal, and a data signal each having a voltage value of a specified level concurrently to the plurality of pixels, so as to compensate the threshold voltage of the drive transistor in each of the plurality of pixels;
- applying a scan signal sequentially to a plurality of rows of pixels, and applying a data signal to the plurality of rows of pixels row by row in response to the sequentially applied scan signal; and
- applying a first voltage, a scan signal, a light emitting control signal, and a data signal each having a voltage value of a specified level concurrently applied to the plurality of pixels, so as to cause the plurality of pixels to emit light concurrently.

BRIEF DESCRIPTION OF THE DRAWINGS

Other objects and advantages of the present disclosure will become apparent from the following description of the present disclosure with reference to the drawings, and the following description may assist in a comprehensive understanding of the present disclosure.

Figure 1:
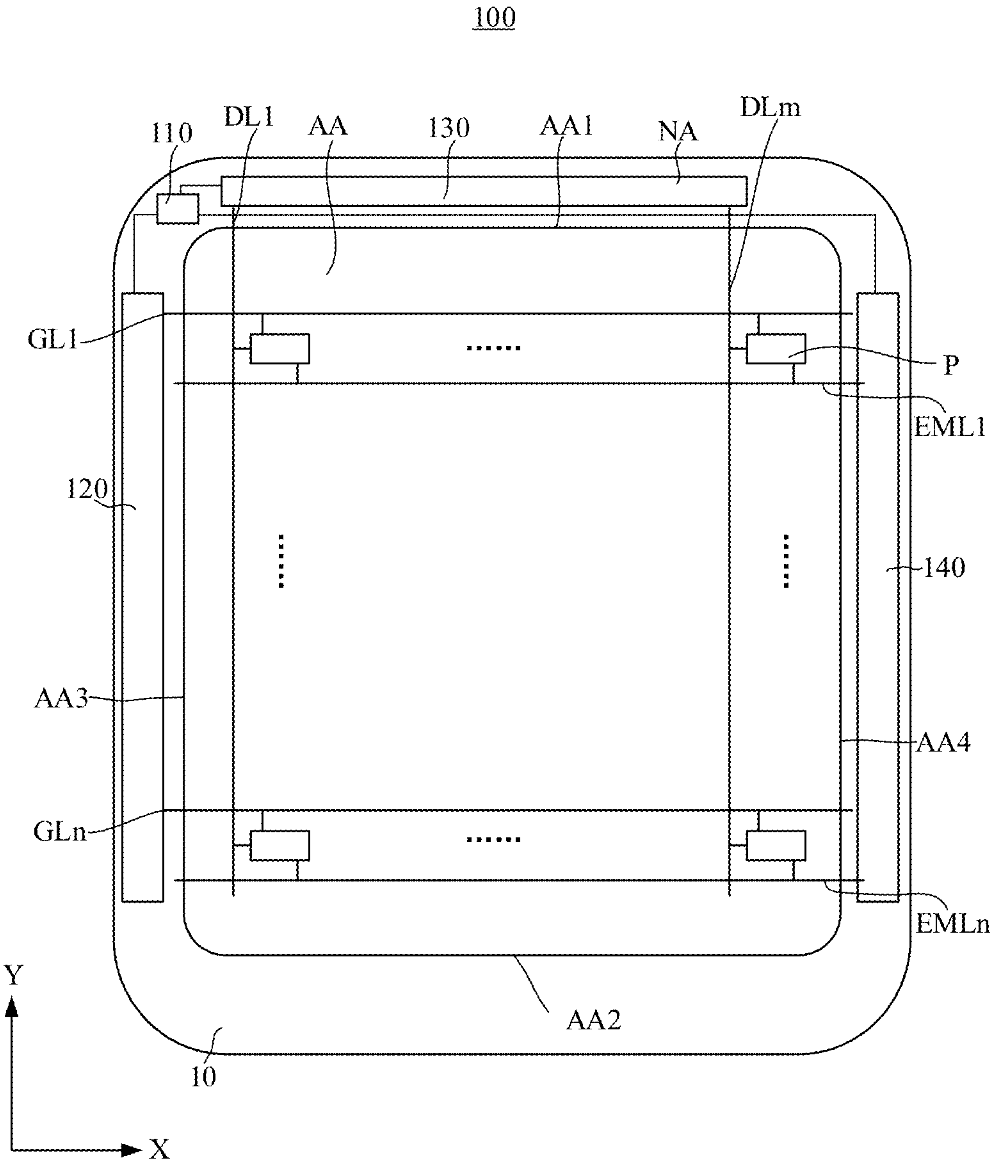
FIG. 1 is a block diagram of an organic light emitting display device according to some exemplary embodiments of the present disclosure.

It should be noted that, in the drawings for describing embodiments of the present disclosure, the dimensions of layers, structures or regions may be exaggerated or reduced for clarity, i.e., the drawings are not drawn to actual scale.

DETAILED DESCRIPTION OF EMBODIMENTS

In the following description, for the purposes of explanation, numerous specific details are elaborated in order to provide a thorough understanding of various exemplary embodiments. However, it is apparent that various exemplary embodiments may be practiced without these specific details or with one or more equivalent arrangements. In other instances, well-known structures and devices are shown in the block diagram form in order to avoid unnecessarily obscuring the various exemplary embodiments. Furthermore, the various exemplary embodiments may vary, but are not necessarily exclusive. For example, the specific shape, configuration, and characteristic of an exemplary embodiment may be used or implemented in another exemplary embodiment without departing from the inventive concept.

In the drawings, the size and relative size of the element may be exaggerated for clarity and/or descriptive purposes. As such, the size and relative size of the various elements are not necessarily limited to those shown in the figures. When the exemplary embodiments may be implemented differently, the specific process sequence may be performed differently from the described sequence. For example, two consecutively described processes may be performed substantially concurrently or in the reverse order of that described. Furthermore, the same reference numeral refers to the same element.

When an element is described as being "on", "connected to", or "coupled to" another element, the element can be directly on the another element, directly connected to the another element, directly coupled to the another element or a intervening element may be present. However, when an element is described as being "directly on", "directly connected to", or "directly coupled to" another element, there is no intervening element present. Other terms and/or expressions used to describe the relationship between elements should be interpreted in a similar fashion, e.g., "between" versus "directly between", "adjacent" versus "directly adjacent" or "on" versus "directly on" etc. Furthermore, the term "connection" may refer to a physical connection, an electrical connection, a communication connection, and/or a fluid connection. In addition, the X, Y, and Z axes are not limited to the three axes of the rectangular coordinate system, and may be interpreted in a broader sense. For example, the X, Y, and Z axes may be perpendicular to each other, or may represent different directions that are not perpendicular to each other. For the purposes of the present disclosure, "at least one of X, Y, and Z" and "at least one selected from the group consisting of X, Y, and Z" may be interpreted as X only, Y only, Z only, or any combination of two or more of X, Y and Z such as XYZ, XY, YZ and XZ. As used herein, the term "and/or" includes any and all combinations of one or more of the associated listed items.

It should be noted that, although the terms "first", "second", etc. may be used herein to describe various parts, components, elements, regions, layers and/or sections, these parts, components, elements, regions, layers and/or sections should not be limited by these terms. Rather, these terms are used to distinguish one part, component, element, region, layer and/or section from another. Thus, for example, the first part, first component, first element, first region, first layer and/or first section discussed below could be termed the second part, second component, second element, second region, second layer and/or second section, which are not departing from the teachings of the present disclosure.

For ease of description, the terms of spatial relationship, e.g., "up", "down", "left", "right", etc. may be used herein to describe the relationship between one element or feature and another element or feature as shown in the figures. It should be understood that the terms of spatial relationship are intended to encompass other different orientations of the device in use or operation in addition to the orientation depicted in the figures. For example, if the device in the figures is turned over, elements described as "below" or "beneath" other elements or features would be oriented to "on" or "above" the other elements or features.

Herein, the terms "substantially", "about", "approximately", "roughly" and other similar terms are used as terms of approximation rather than terms of degree, and they are intended to account for inherent deviations from measurements or calculations that would be recognized by those of ordinary skill in the art. Account for factors such as process fluctuations, measurement problems, and errors associated with the measurement of a specific quantity (i.e., measurement system limitation), the term "about" or "approximately" as used herein includes the stated value, and it means the specific value, as determined by those of ordinary skill in the art, is within acceptable deviation range. For example, "about" can mean within one or more standard deviations, or within ±30%, ±20%, ±10%, ±5% of the stated value.

It should be noted that, herein, the expression "same layer" refers to a layer structure formed by using the same film forming process to form a film layer for forming a specific pattern, and then patterning the film layer through a patterning process using the same mask. Depending on difference of the specific pattern, one patterning process may include multiple exposure, development or etching process, and the specific pattern in the formed layer structure may be continuous or discontinuous. That is, multiple elements, components, structures and/or sections located on the "same layer" are composed of the same material and formed by the same patterning process: typically, multiple elements, components, structures and/or sections located on the "same layer" have approximately the same thickness.

Embodiments of the present disclosure provide a display substrate and a display device. The display substrate includes: a base substrate: a plurality of pixels located on the base substrate and arranged in an array, wherein the pixel includes a light emitting element and a pixel driving circuit for driving the light emitting element to emit light, and the pixel driving circuit includes a light emitting control circuit and a light emitting driving circuit: and a light emitting control line and a first power supply line located on the base substrate, wherein the light emitting control line and the first power supply line are electrically connected to the light emitting control circuit, the light emitting control line is configured to provide a light emitting control signal, and the first power supply line is configured to provide a first voltage, wherein the light emitting control circuits of pixels located in two adjacent rows share the same light emitting control line: and wherein the light emitting control circuit includes a light emitting control transistor having a gate, a first electrode and a second electrode, the gate of the light emitting control transistor is electrically connected to the light emitting control line, one of the first electrode and the second electrode of the light emitting control transistor is connected to the first power supply line, and the first power supply line extends in parallel to the light emitting control line. In this way, the number of light emitting control lines that need to be provided can be reduced. That is to say, the space occupied by the light emitting control lines can be saved and simplified, and the risk of parasitic capacitance and short-circuit defects caused by the overlapping of the light emitting control line and other signals can be significantly reduced.

It should be noted that, the transistor used in all the embodiments of the present disclosure may be a thin film transistor, a field effect transistor, or other device with the same characteristics. Unless otherwise specified, in the embodiments of the present disclosure, the source and drain of the transistor are symmetrical to each other, so the source and drain can be interchanged. In the embodiments of the present disclosure, the source of the transistor is referred to as the first electrode, and the drain is referred to as the second electrode: alternatively, the drain of the transistor may be referred to as the first electrode and the source as the second electrode. According to the form in the drawings, a middle terminal of the transistor is the gate, a signal input terminal is the source, and a signal output terminal is the drain. In addition, the transistor used in the embodiment of the present disclosure may be any one of a p-type transistor and an n-type transistor, wherein the p-type transistor is turned on when the gate is at a low level and turned off when the gate is at a high level, and the n-type transistor is turned on when the gate is at a high level and turned off when the gate is at a low level.

FIG. 1 is a block diagram of an organic light emitting display device according to some exemplary embodiments of the present disclosure. With reference to FIG. 1, an organic light emitting display device 100 may include: a base substrate 10, a timing controller 110 on the base substrate 10, a scan driver 120, a data driver 130 and a light emitting control driver 140. The display substrate of the display device may include a display area AA and a non-display area NA. The display area AA and the non-display area NA may include a plurality of boundaries, such as AA1, AA2, AA3 and AA4 as shown in FIG. 1.

For example, at least some of the timing controller 110, the scan driver 120, the data driver 130 and the light emitting control driver 140 described above may be located in the non-display area NA. For example, the scan driver 120 and the light emitting control driver 140 may be located on at least one side of the display area AA, respectively. In the embodiment shown in FIG. 1, the scan driver 120 and the light emitting control driver 140 are located on the left side and right side of the display area AA, respectively. It should be noted that the left side and right side may be the left side and right side of the display substrate (screen) as viewed by human eyes when displaying.

Figure 4:
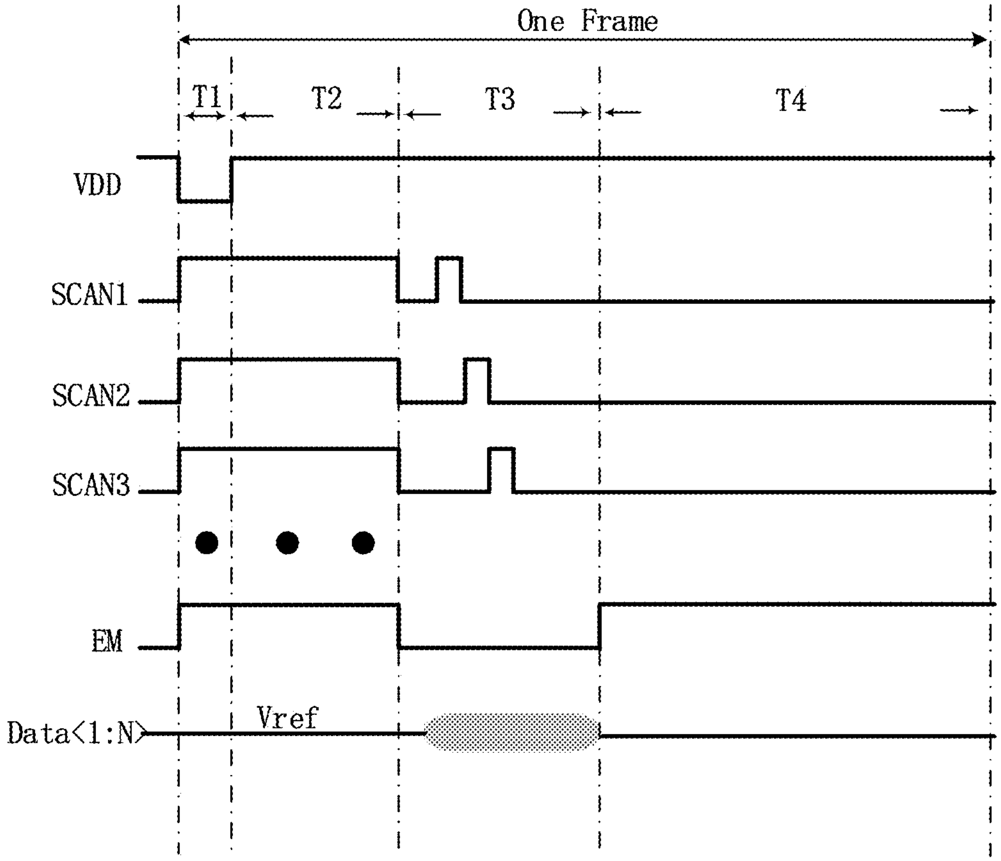
FIG. 4 is an operation timing diagram of a pixel driving circuit of all the pixels of a display device according to some exemplary embodiments of the present disclosure.

It should be noted that, although FIG. 4 shows that the driving circuits are located on the left and right sides of the display area AA, the embodiments of the present disclosure are not limited thereto, and the driving circuit may be located at any suitable position in the non-display area NA.

For example, the scan driver 120 and the light emitting control driver 140 may adopt the GOA technology, that is, Gate Driver on Array. In the GOA technology, the scan driver 120 is directly disposed on the array substrate to replace an external driver chip. Each GOA unit acts as a stage of shift register. Each stage of shift register is electrically connected to the scanning signal line. Respective stages of shift registers output the turn-on voltage sequentially, so as to achieve the scanning of pixels row-by-row: In some embodiments, the each stage of shift register may be connected to a plurality of scanning signal lines. In this way, it can adapt to the development trend of high resolution and narrow boundary of the display substrate.

Referring to FIG. 1, a left GOA circuit (i.e. the scan driver 120), a plurality of pixels P located in the display area AA, and a right GOA circuit (i.e. the light emitting control driver 140) are provided on the display substrate. Each of the scan driver 120 and the light emitting control driver 140 is electrically connected to a display IC through signal lines. The supply of the GOA signal is controlled by the display IC. The display IC may be arranged on the lower side of the display substrate (the direction of the human eyes). Each of the scan driver 120 and the light emitting control driver 140 is also electrically connected to respective pixels through signal lines (e.g. a scanning signal line and a light emitting control line), in order to supply driving signals to respective pixels.

The timing controller 110, the scan driver 120, the data driver 130 and the light emitting control driver 140 may work together to drive each pixel P in the display substrate to display.

Continuing to refer to FIG. 1, the display device further includes various signal lines provided on the display substrate. The various signal lines include the scanning signal line, the light emitting control line, the data line, the first power supply line and the second power supply line, etc., so as to provide various signals such as the scan signal, the control signal, the data signal, and the power supply voltage to the pixel driving circuit in each sub-pixel. In the embodiment shown in FIG. 1, a plurality of scanning signal lines, a plurality of data lines and a plurality of light emitting control lines are schematically shown. The plurality of scanning signal lines, the plurality of data lines, and the plurality of light emitting control lines may be electrically connected to respective sub-pixels.

For example, the plurality of pixels P may be arranged on the display substrate in an array of n rows and m columns. The plurality of scanning signal lines may include scanning signal lines GL1 to GLn, the plurality of data lines may include data lines DL1 to DLm, and the plurality of light emitting control lines may include EML1 to EMLn.

In addition, each pixel P receives a first voltage VDD and a second voltage VSS from the outside. In each pixel P, light having brightness (e.g., predetermined brightness) corresponding to the data signal is generated in the OLED.

Figure 2:
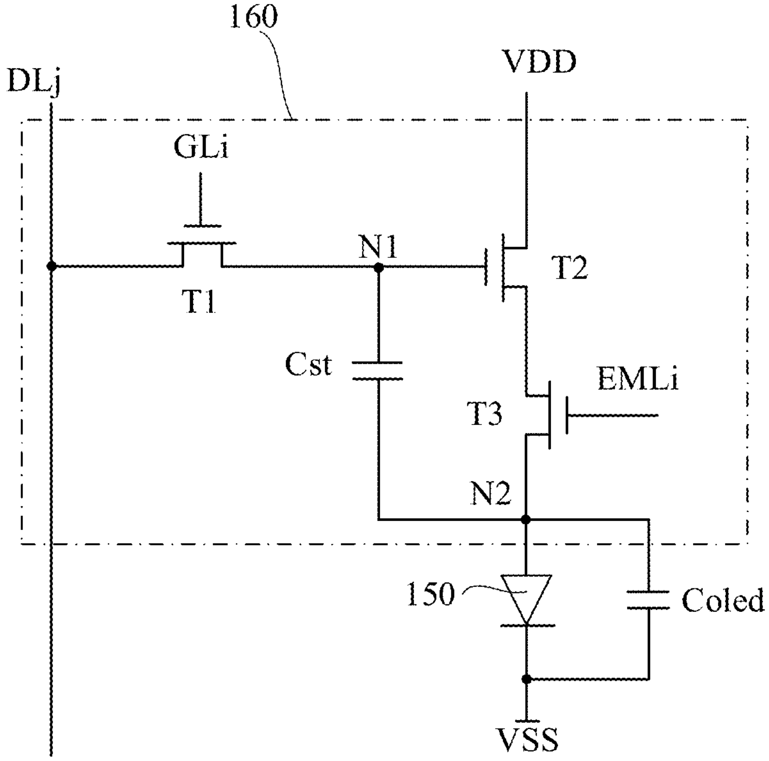
FIG. 2 is an equivalent circuit diagram of a pixel driving circuit of one pixel of a display device according to some exemplary embodiments of the present disclosure.

FIG. 2 is an equivalent circuit diagram of a pixel driving circuit of one pixel of a display device according to some exemplary embodiments of the present disclosure. As shown in FIG. 2, a pixel P according to some exemplary embodiments of the present disclosure includes an OLED 150 and a pixel driving circuit 160 for controlling current supplied to the OLED. An anode of the OLED 150 is connected to the pixel driving circuit 160, and a cathode of the OLED is connected to the second voltage VSS. The OLED generates light having brightness (e.g., predetermined brightness) corresponding to the current supplied from the pixel driving circuit 160.

For example, in the embodiment shown in FIG. 2, the pixel driving circuit 160 includes three transistors T1 to T3 and one capacitor Cst. It should be noted that, considering the capacitance of a parasitic capacitor Coled generated by the anode and cathode of the OLED, the coupling effect of the capacitor Cst and the parasitic capacitor Coled is utilized. As shown in FIG. 2, a gate of the first transistor T1 is connected to the scanning signal line GLi (for example, the scanning signal line GLi may be any one of the above-mentioned GL1 to GLn), and a first electrode of the first transistor T1 is connected to the data line DLj (for example, the data line DLj may be any one of the above-mentioned DL1 to DLm). A second electrode of the first transistor T1 is connected to a first node N1. Here, the scan signal is applied to the gate of the first transistor T1, and the data signal is applied to the first electrode of the first transistor T1. The first transistor T1 serves as a switching transistor. A gate of the second transistor T2 is connected to the first node N1, a first electrode of the second transistor T2 is connected to the first voltage VDD, and a second electrode of the second transistor T2 is connected to a first electrode of the third transistor T3. The second transistor T2 serves as a driving transistor. A gate of the third transistor T3 is connected to the light emitting control line EMLi (for example, the light emitting control line EMLi may be any one of the above EML1 to EMLn), and the first electrode of the third transistor T3 is connected to the second electrode of the second transistor T2, a second electrode of the third transistor T3 is connected to a second node N2. The anode of the OLED is connected to the second node N2, that is, the second electrode of the third transistor T3 is connected to the anode of the OLED. The cathode of the OLED is connected to the second voltage VSS. The capacitor Cst is connected between the first node N1 and the second node N2.

In the embodiment shown in FIG. 2, each of the first transistor T1 to the third transistor T3 is implemented as a NMOS transistor. In other embodiments, each of the first transistor T1 to the third transistor T3 may be implemented as a PMOS transistor. Alternatively, in some embodiments, at least one of the first transistor T1 to the third transistor T3 is implemented as the NMOS transistor, and the others are implemented as PMOS transistors. The embodiments of the present disclosure do not specifically limit this.

In the embodiment shown in FIG. 2, a 3T1C circuit is used as an example to describe the pixel driving circuit of the pixel of the embodiment of the present disclosure. However, the embodiment of the present disclosure is not limited thereto. For example, the pixel driving circuit may adopt circuits of other structures (e.g. 7T1C).

Figure 3:
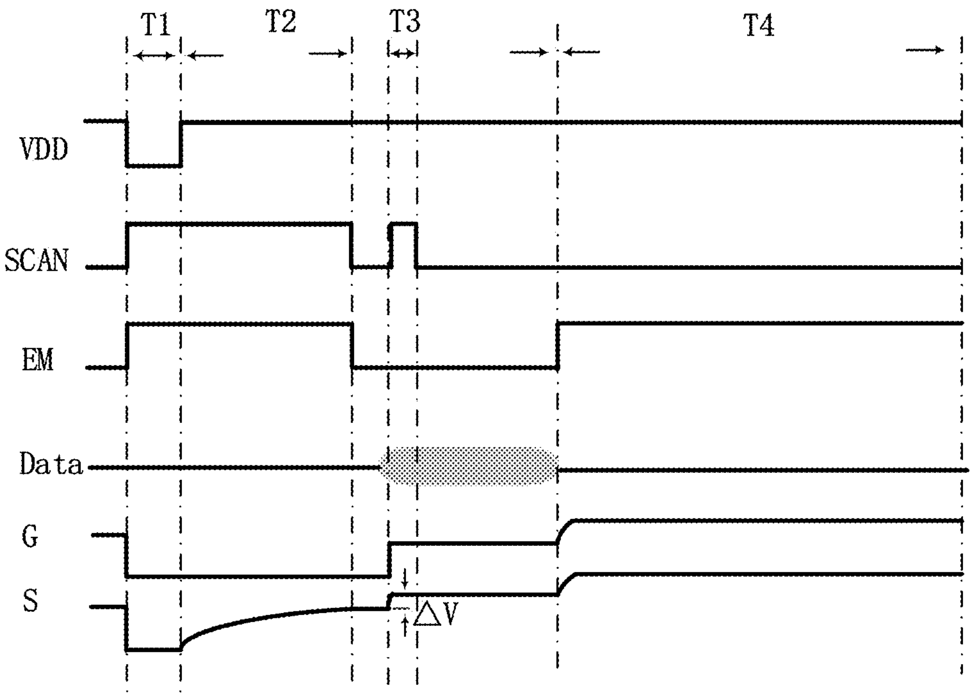
FIG. 3 is an operation timing diagram of a pixel driving circuit of one pixel of a display device according to some exemplary embodiments of the present disclosure.

FIG. 3 is an operation timing diagram of a pixel driving circuit of one pixel of a display device according to some exemplary embodiments of the present disclosure. Referring to the combination of FIG. 2 and FIG. 3, the operation timing of the pixel driving circuit may be divided into at least four phases in one frame.

In a first phase T1, the first voltage VDD is at a low level, a scanning signal voltage SCAN and a light emitting control voltage EM are at a high level, and a data signal Data is a Vref signal. At this time, the first transistor T1 to the third transistor T3 are all turned on, and the first node N1 and the second node N2 are reset. Therefore, the first phase T1 may be called a reset phase.

In a second phase T2, the first voltage VDD becomes at a high level, the scanning signal voltage SCAN and the light emitting control voltage EM remain at a high level, and the Vref signal remains at the first node N1. At this time, the first transistor T1 to the third transistor T3 are all turned on to charge the second node N2. When the voltage between the gate and the source of the second transistor T2 Vg (a gate voltage of the second transistor T2)−Vs (a source voltage of the second transistor T2)=Vth (a threshold voltage of the second transistor T2), that is, Vs=Vref−Vth, the second phase T2 ends. The second phase T2 is a phase of compensating for the threshold voltage of the driving transistor provided in each pixel P. Therefore, the second phase T2 may be called a compensation phase.

In a third phase T3, the light emitting control voltage EM becomes at a low level, the first voltage VDD is at a high level, and the scanning signal voltage SCAN remains at a high level. The first transistor T1 and the second transistor T2 are turned on, while the third transistor T3 is not turned on. The data signal Vdata is written at the first node N1. At this time, Vs is coupled by the N1 node voltage (Vref becomes Vdata), that is, ΔVs=a(Vdata−Vref), a=Cst/(Cst+Coled), and Vs=Vref−Vth+a(Vdata−Vref). Since the third transistor T3 is in a non-conducting state, the second node N2 is not affected, that is, this design is compatible with the D-Mux circuit. The third phase T3 may be referred to as a data writing phase.

In a fourth phase T4, the light emitting control voltage EM becomes at a high level, and the light emitting device OLED of the display substrate starts to emit light. Therefore, the fourth phase T4 can be called a light emitting phase. A light emitting current Ioled of the light emitting device OLED can be calculated by the following formula:

$$I\text{oled}=K(Vgs-Vth)^2=K((1-a)(V\text{data}-V\text{ref}))^2,$$ wherein $K$ is a constant.

It can be seen from this formula that the threshold voltage Vth of the driving transistor is eliminated, that is, the threshold voltage Vth of the driving transistor can be compensated, so that the light emitting current Ioled is not affected by the variation of the threshold voltage Vth.

FIG. 4 is an operation timing diagram of a pixel driving circuit of all pixels of a display device according to some exemplary embodiments of the present disclosure. That is, FIG. 4 is a full-screen control timing diagram. As shown in FIG. 4, a first phase T1 is a full-screen reset phase, a second phase T2 is a full-screen compensation phase, a third phase T3 is a full-screen row-by-row data writing phase, and a fourth phase T4 is a full-screen light emitting phase.

In the third phase T3, data is written row by row according to row-by-row scan signals SCAN1, SCAN2, SCAN3, etc. For example, the row-by-row data writing operation may be sequentially performed for each corresponding scanning signal line.

In the embodiment of the present disclosure, the reset of the first phase T1, the compensation of the second phase T2, and the light emission of the fourth phase T4 are performed together and simultaneously or concurrently on the entire display substrate. In the embodiment of FIG. 4, when the scan signal is sequentially supplied to the scanning signal lines GL1 to GLn in a partial phase of one frame (the third phase T3), each pixel P receives the data signal supplied to the data lines DL1 to DLm. The first voltage VDD applied to the pixel P and the light emitting control signals applied to the light emitting control lines EML1 to EMLn are applied to the pixel P together and simultaneously (i.e. concurrently) within one frame. That is, the pixel P according to the embodiment of the present disclosure operates in a "simultaneous (or concurrent) light emission" manner.

Figure 5:
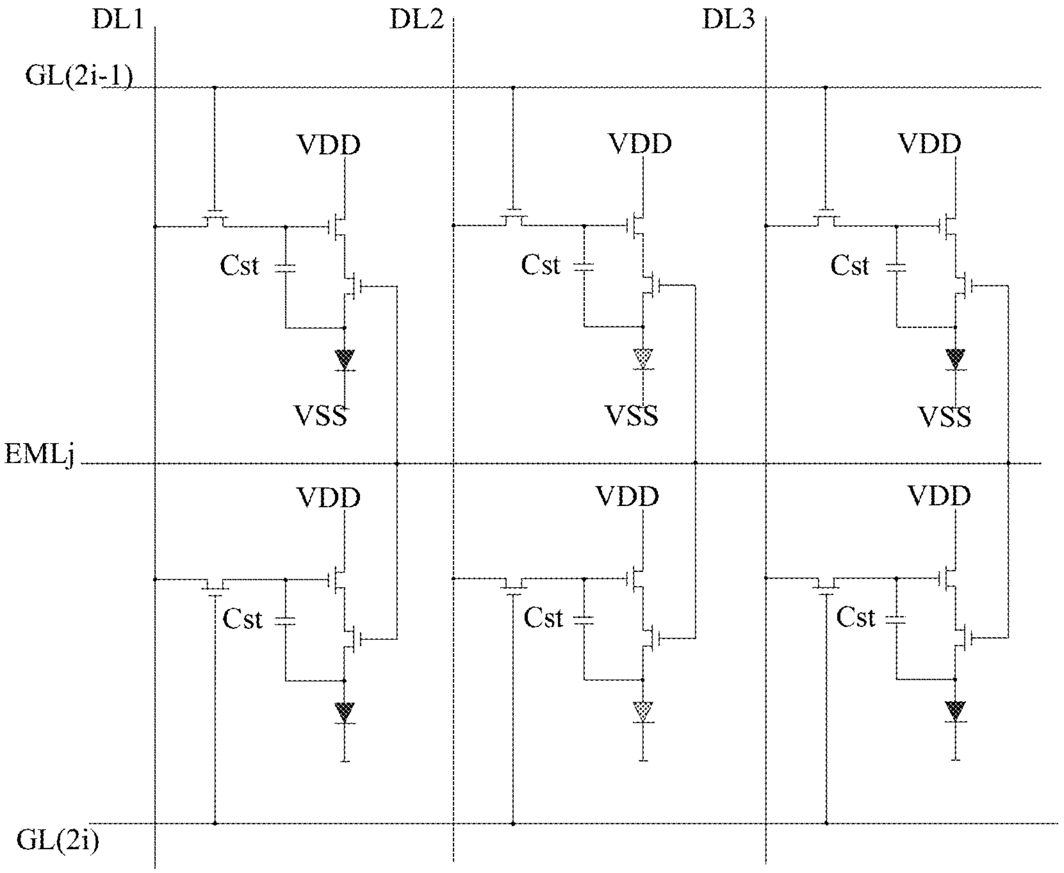
FIG. 5 is an equivalent circuit diagram of a pixel driving circuit of a plurality of adjacent pixels of a display substrate according to some exemplary embodiments of the present disclosure.
Figure 6:
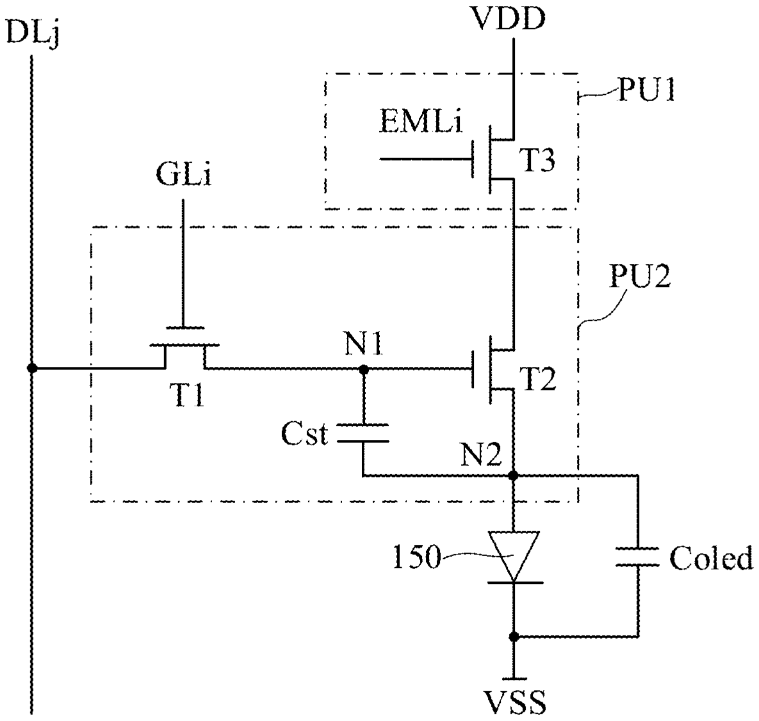
FIG. 6 is an equivalent circuit diagram of a pixel driving circuit of one pixel shown in FIG. 5.

FIG. 5 is an equivalent circuit diagram of a pixel driving circuit of a plurality of adjacent pixels of a display substrate according to some exemplary embodiments of the present disclosure, and FIG. 6 is an equivalent circuit diagram of a pixel driving circuit of one pixel shown in FIG. 5. Referring to the combination of FIG. 5 and FIG. 6, the pixel driving circuit 160 may include three transistors T1 to T3 and one capacitor Cst. It should be noted that, considering the capacitance of the parasitic capacitor Coled generated by the anode and cathode of the OLED, the coupling effect of the capacitor Cst and the parasitic capacitor Coled is utilized. As shown in FIG. 6, the gate of the first transistor T1 is connected to the scanning signal line GLi (for example, the scanning signal line GLi can be any one of the above-mentioned GL1 to GLn), and the first electrode of the first transistor T1 is connected to the data line DLj (for example, the data line DLj may be any one of the above-mentioned DL1 to DLm). The second electrode of the first transistor T1 is connected to the first node N1. Here, the scan signal is applied to the gate of the first transistor T1, and the data signal is applied to the first electrode of the first transistor T1. The first transistor T1 serves as a switching transistor. The gate of the second transistor T2 is connected to the first node N1, the first electrode of the second transistor T2 is connected to the first voltage VDD through the first and second electrodes of the third transistor T3, and the second electrode of the second transistor T2 is connected to the second node N2. The second transistor T2 serves as a driving transistor. The gate of the third transistor T3 is connected to the light emitting control line EMLi (for example, the light emitting control line EMLi can be any one of the above EML1 to EMLn), the first electrode of the third transistor T3 is connected to the second electrode of the second transistor T2, and the second electrode of the third transistor T3 is connected to the first voltage VDD. The anode of the OLED is connected to the second node N2, that is, the second electrode of the second transistor T2 is connected to the anode of the OLED. The cathode of the OLED is connected to the second voltage VSS. The capacitor Cst is connected between the first node N1 and the second node N2.

As shown in FIG. 5, two adjacent rows of the pixels P may share one light emitting control line EMLj. For example, in the embodiment shown in FIG. 5, a first row of pixel P located above may be an odd-row pixel, and a second row of pixel P located below may be an even-row pixel. The odd-row pixel P and the even-row pixel P may share one light emitting control line EMLj. The light emitting control line EMLi may be located between the odd-row pixel P and the even-row pixel P. In this way; the number of light emitting control lines that need to be provided can be reduced. That is to say, the space occupied by the light emitting control lines can be saved and simplified, and the risk of parasitic capacitance and short-circuit defects caused by the overlapping of the light emitting control lines and other signals can be significantly reduced in this embodiment.

Continuing to refer to FIG. 5 and FIG. 6, the pixel P may include: a light emitting control circuit PU1, a light emitting driving circuit PU2 and a light emitting element 150. For example, the light emitting control circuit PU1 may include the third transistor T3. The light emitting driving circuit PU2 may include the first transistor T1, the second transistor T2 and the capacitor Cst. The light emitting element 150 may include an LED.

For example, multiple rows of pixels P and multiple scanning signal lines may be connected in a one-to-one correspondence, that is, the pixel driving circuit of multiple pixels P located in the same row may be electrically connected to one scanning signal line. Referring to FIG. 5, the gate of the first transistor T1 in the odd-row pixel P may be electrically connected to one scanning signal line GL(2i−1), and the gate of the first transistor T1 in the even-row pixel P may be electrically connected to one scanning signal line GL(2i), where i is a positive integer.

Referring to FIG. 5, the gate of the third transistor T3 in the odd-row pixel P and the gate of the third transistor T3 in the even-row pixel P may be electrically connected to the same light emitting control line EMLj, e.g., j may be equal to 2i.

For example, the pixel driving circuit of the odd-row pixel P and the pixel driving circuit of the even-row pixel P may be located on the two sides of the same light emitting control line EMLj, respectively.

The scanning signal line GL(2i−1) may extend substantially in parallel to the scanning signal line GL(2i), for example, along a first direction X in FIG. 5. The light emitting control line EMLj may extend substantially parallel to the scanning signal line GL(2i−1) and the scanning signal line GL(2i), that is, also extend in the first direction X. The scanning signal line GL(2i−1) and the scanning signal line GL(2i) may be located on the two sides of the same light emitting control line EMLj, respectively. For example, the scanning signal line GL(2i−1) may be located on a side of the pixel driving circuit of the odd-row pixel P away from the same light emitting control line EMLj, and the scanning signal line GL(2i) may be located on a side of the pixel driving circuit of the even-row pixel P away from the same light emitting control line EMLj.

In this embodiment, for one pixel P, the scanning signal line electrically connected to the pixel driving circuit of the pixel P and the light emitting control line electrically connected to the pixel driving circuit of the pixel P may be located on the two sides of the pixel driving circuit of the pixel P, respectively.

Figure 7:
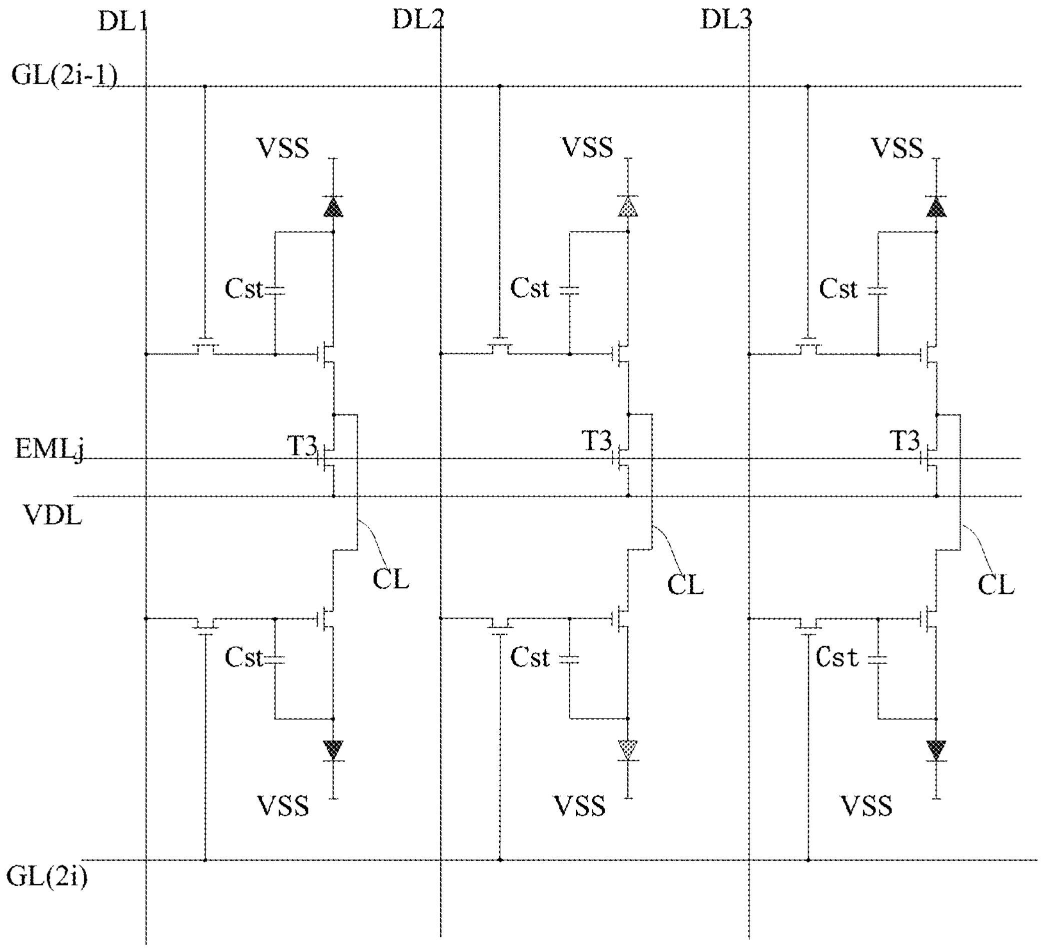
FIG. 7 is an equivalent circuit diagram of a pixel driving circuit of a plurality of adjacent pixels of a display substrate according to some exemplary embodiments of the present disclosure.

FIG. 7 is an equivalent circuit diagram of a pixel driving circuit of a plurality of adjacent pixels of a display substrate according to some exemplary embodiments of the present disclosure. In this embodiment, it is noted that the pixel driving circuit of a single pixel, may have a structure as described above with reference to FIG. 6 and the above description for FIG. 6 for the structure of the pixel driving circuit of a single pixel, which will not be repeated here.

Referring to the combination of FIG. 6 and FIG. 7, two adjacent rows of pixels P may share one light emitting control line EMLj. For example, in the embodiment shown in FIG. 7, a first row of pixel P located above may be an odd-row pixel, and a second row of pixel P located below may be an even-row pixel. The odd-row pixel P and the even-row pixel P may share one light emitting control line EMLj. The light emitting control line EMLj may be located between the odd-row pixel P and the even-row pixel P.

Continuing to refer to FIG. 7, two pixels P located in two adjacent rows and the same column may share one light emitting control circuit PU1, that is, share the same third transistor T3. As at least two pixels P can share the same light emitting control circuit PU1, the number of light emitting control lines and light emitting control circuits PU1 that need to be provided can be reduced in the embodiments of the present disclosure. Therefore, the effect of optimizing the pixel space can be achieved without affecting the normal display of the pixel P, that is, the area occupied by the pixel driving circuit of the pixel P on the base substrate can be reduced. Correspondingly, the area of a remaining space on the base substrate is increased, for example, the remaining space can be used for providing the scan driving circuit and the scanning signal line to be connected to the scan driving circuit. In this case, it is possible to implement a display substrate having a scan driving circuit provided within the substrate GIA (Gate Drive in AA), that is, a GIA display substrate.

For example, multiple rows of pixels P and multiple scanning signal lines may be connected in a one-to-one correspondence, that is, the pixel driving circuit of multiple pixels P located in the same row may be electrically connected to one scanning signal line. Referring to FIG. 7, a gate of the first transistor T1 in the odd-row pixel P may be electrically connected to one scanning signal line GL(2i−1), and a gate of the first transistor T1 in the even-row pixel P may be electrically connected to one scanning signal line GL(2i), where i is a positive integer.

Referring to FIG. 7, a gate of the third transistor T3 in the odd-row pixel P and a gate of the third transistor T3 in the even-row pixel P may be electrically connected to the same light emitting control line EMLj, e.g., j may be equal to 2i.

For example, the pixel driving circuit of the odd-row pixel P and the pixel driving circuit of the even-row pixel P may be located on the two sides of the same light emitting control line EMLj, respectively.

The scanning signal line GL(2i−1) may extend substantially in parallel to the scanning signal line GL(2i), for example, along a first direction X in FIG. 7. The light emitting control line EMLj may extend substantially parallel to the scanning signal line GL(2i−1) and the scanning signal line GL(2i), that is, also extend in the first direction X. The scanning signal line GL(2i−1) and the scanning signal line GL(2i) may be located on the two sides of the same light emitting control line EMLj, respectively. For example, the scanning signal line GL(2i−1) may be located on the side of the pixel driving circuit of the odd-row pixel P away from the same light emitting control line EMLj, and the scanning signal line GL(2i) may be located on the pixel driving circuit of the even-row pixel P away from the side of the same light emitting control line EMLj.

For example, a first power supply line VDL may extend substantially parallel to the scanning signal line GL(2i−1) and the scanning signal line GL(2i), and the first power supply line VDL may extend substantially parallel to the light emitting control line EMLj, that is, also extend in the first direction X. Exemplarily, the first power supply line VDL is adjacent to and spaced apart from the light emitting control line EMLj by a prescribed distance. For example, the first power supply line VDL may be located between the light emitting control line EMLj and the light emitting driving circuit PU2 of the even-row pixel P.

In the two pixels P located in adjacent rows and the same column, the light emitting driving circuit PU2 of the odd-row pixel P and the light emitting driving circuit PU2 of the even-row pixel P may be axisymmetrically arranged to each other with respect to the same light emitting control line EMLj.

The shared third transistor T3 may be located between the light emitting driving circuits PU2 of two adjacent pixels P. For example, the shared third transistor T3 may be located between the light emitting driving circuit PU2 of the odd-row pixel P and the first power supply line VDL.

In the two pixels P located in adjacent rows and the same column, the gate of the shared third transistor T3 is electrically connected to the light emitting control line EMLj. The first electrode of the shared third transistor T3 is electrically connected to the second electrode of the second transistor T2 of the odd-row pixel P and the second electrode of the second transistor T2 of the even-row pixel P, respectively. The second electrode of the shared third transistor T3 is electrically connected to the first power supply line VDL.

Referring to FIG. 7, a second electrode of the second transistor T2 of the even-row pixel P is electrically connected to the first electrode of the shared third transistor T3 through a connection line CL. At least a portion of the connection line CL extends along a second direction Y. The connection line CL is arranged to intersect the first power supply line VDL, that is, the orthographic projection of the connection line CL on the base substrate intersects with the orthographic projection of the first power supply line VDL on the base substrate. The connection line CL and the light emitting control line EMLj are arranged to intersect, that is, the orthographic projection of the connection line CL on the base substrate intersects with the orthographic projection of the light emitting control line EMLj on the base substrate.

Figure 8:
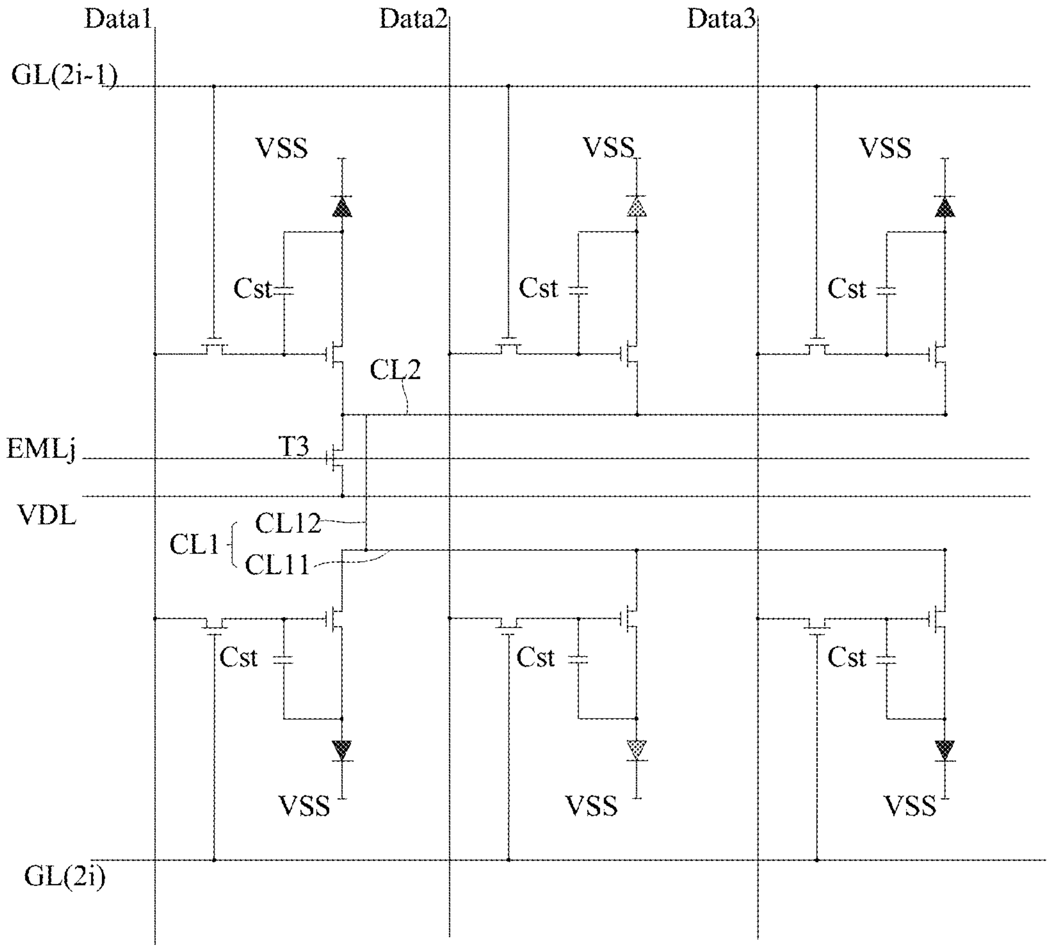
FIG. 8 is an equivalent circuit diagram of a pixel driving circuit of a plurality of adjacent pixels of a display substrate according to some exemplary embodiments of the present disclosure.

FIG. 8 is an equivalent circuit diagram of a pixel driving circuit of a plurality of adjacent pixels of a display substrate according to some exemplary embodiments of the present disclosure. In this embodiment, it is noted that the pixel driving circuit of a single pixel may have a structure as described above with reference to FIG. 6, which will not be repeated here. Referring to the combination of FIG. 6 and FIG. 8, two adjacent rows of pixels P may share one light emitting control line EMLj. For example, in the embodiment shown in FIG. 8, the first row of pixel P located above may be the odd-row pixel, and the second row of pixel P located below may be the even-row pixel. The odd-row pixel P and the even-row pixel P may share one light emitting control line EMLj. The light emitting control line EMLj may be located between the odd-row pixel P and the even-row pixel P.

Continuing to refer to FIG. 8, two adjacent rows of pixels P may share one light emitting control circuit PU1, that is, share the same third transistor T3. That is, a plurality of the odd-row pixels P and a plurality of the even-row pixels P may share one light emitting control circuit PU1. The number of light emitting control lines and light emitting control circuits PU1 that need to be provided can be reduced in the embodiments of the present disclosure. Therefore, the effect of optimizing the pixel space can be achieved without affecting the normal display of the pixel P, that is, the area occupied by the pixel driving circuit of the pixel P on the base substrate can be reduced. Correspondingly, the area of a remaining space on the base substrate is increased, for example, the remaining space can be used for providing the scan driving circuit and the scanning signal line to be connected to the scan driving circuit. In this case, it is possible to implement a display substrate having a scan driving circuit is provided within the substrate GIA (Gate Drive in AA), that is, a GIA display substrate.

For example, multiple rows of pixels P and multiple scanning signal lines may be connected in a one-to-one correspondence, that is, the pixel driving circuit of multiple pixels P located in the same row may be electrically connected to one scanning signal line. Referring to FIG. 8, a gate of the first transistor T1 in the odd-row pixel P may be electrically connected to one scanning signal line GL(2i−1), and a gate of the first transistor T1 in the even-row pixel P may be electrically connected to one scanning signal line GL(2i), where i is a positive integer.

Referring to FIG. 8, a gate of the third transistor T3 in the odd-row pixel P and a gate of the third transistor T3 in the even-row pixel P may be electrically connected to the same light emitting control line EMLj, e.g., j may be equal to 2i.

For example, the pixel driving circuit of the odd-row pixel P and the pixel driving circuit of the even-row pixel P may be located on the two sides of the same light emitting control line EMLj, respectively.

The scanning signal line GL(2i−1) may extend substantially in parallel to the scanning signal line GL(2i), for example, along a first direction X in FIG. 8. The light emitting control line EMLj may extend substantially parallel to the scanning signal line GL(2i−1) and the scanning signal line GL(2i), that is, also extend in the first direction X. The scanning signal line GL(2i−1) and the scanning signal line GL(2i) may be located on the two sides of the same light emitting control line EMLj, respectively. For example, the scanning signal line GL(2i−1) may be located on a side of the pixel driving circuit of the odd-row pixel P away from the same light emitting control line EMLj, and the scanning signal line GL(2i) may be located on a side of the pixel driving circuit of the even-row pixel P away from the same light emitting control line EMLj.

For example, a first power supply line VDL may extend substantially parallel to the scanning signal line GL(2i−1) and the scanning signal line GL(2i), and the first power supply line VDL may extend substantially parallel to the light emitting control line EMLj, that is, also extend in the first direction X. Exemplarily, the first power supply line VDL is adjacent to and spaced apart from the light emitting control line EMLj by a prescribed distance. For example, the first power supply line VDL may be located between the light emitting control line EMLj and the light emitting driving circuit PU2 of the even-row pixel P.

In a plurality of pixels P located in adjacent rows, the light emitting driving circuit PU2 of the odd-row pixel P and the light emitting driving circuit PU2 of the even-row pixel P may be axisymmetrically arranged to each other with respect to the same light emitting control line EMLj.

The shared third transistor T3 may be located between the light emitting driving circuits PU2 of two adjacent pixels P. For example, the shared third transistor T3 may be located between the light emitting driving circuit PU2 of the odd-row pixel P and the first power supply line VDL.

In a plurality of pixels P located in adjacent rows, the gate of the shared third transistor T3 is electrically connected to the light emitting control line EMLj. The first electrode of the shared third transistor T3 is electrically connected to the second electrode of the second transistor T2 of the odd-row pixel P and the second electrode of the second transistor T2 of the even-row pixel P, respectively. The second electrode of the shared third transistor T3 is electrically connected to the first power supply line VDL.

Referring to FIG. 8, a second electrode of the second transistor T2 of the even-row pixel P is electrically connected to the first electrode of the shared third transistor T3 through a first connection line CL1. The first connection line CL1 may include a first portion CL11 and a second portion CL12. For example, at least a part of the first portion CL11 may extend substantially along the first direction X, and the second portion CL12 may extend substantially along the second direction Y.

The second electrode of the second transistor T2 of the odd-row pixel P is electrically connected to the first electrode of the shared third transistor T3 through a second connection line CL2. For example, the second connection line CL2 may extend substantially along the first direction X.

The second electrodes of the second transistor T2 of the odd-row pixel P are connected together through the second connection line CL2, and are electrically connected to the first electrode of the shared third transistor T3.

The second electrodes of the second transistor T2 of the even-row pixel P are connected together through the first portion CL11 of the first connection line CL1, and are electrically connected to the first electrode of the shared third transistor T3 through the second portion CL12 of the first connection line CL1. For example, the first portion CL11 of the first connection line CL1 is connected to the second connection line CL2 through the second portion CL12, and then is electrically connected to the first electrode of the third transistor T3.

For example, the second portion CL12 of the first connection line CL1 is arranged to intersect with the first power supply line VDL, that is, the orthographic projection of the second portion CL12 of the first connection line CL1 on the base substrate intersects with the orthographic projection of the first power supply line VDL on the base substrate. The second portion CL12 of the first connection line CL1 is arranged to intersect with the light emitting control line EMLj, that is, the orthographic projection of the second portion CL12 of the first connection line CL1 on the base substrate intersects with the orthographic projection of the light emitting control line EMLj on the base substrate.

In the embodiments of the present disclosure, the number of TFTs in the pixel driving circuit may be reduced by sharing the third transistor T3, thereby facilitating to obtain display products with high PPI. Further, combined with the above-mentioned simultaneous light emitting method, display products with high PPI and high refresh rate can be realized, which eliminates the limitation that pixels cannot be driven due to long compensation time, and also simplifies the control timing and optimizes the layout space, achieving the effect of reducing load and improving yield.

In other embodiments of the present disclosure, a display device is also provided. The display device may include the above-described display substrate. For example, the display device may be a smartphone, a mobile phone, a video phone, an e-book reader, a desktop personal computer (PC), a laptop PC, a netbook PC, a personal digital assistant (PDA), a portable multimedia player (PMP), a digital audio player, a mobile medical device, a camera, a wearable device (such as a headset, an electronic clothing, an electronic wristband or a smart watch), etc.

Although some embodiments in accordance with the present general inventive concept have been illustrated and described, those of ordinary skill in the art will appreciate that these embodiments can be made to change without departing from the principles and spirit of the present general inventive concept, and the scope of the present disclosure is defined by the claims and their equivalents.

What is claimed is:

1. A display substrate, comprising:

a base substrate;

a plurality of pixels located on the base substrate and arranged in an array, wherein the pixel comprises a light emitting element and a pixel driving circuit for driving the light emitting element to emit light, and the pixel driving circuit comprises a light emitting control circuit and a light emitting driving circuit; and a light emitting control line and a first power supply line located on the base substrate, wherein the light emitting control line and the first power supply line are electrically connected to the light emitting control circuit, the light emitting control line is configured to provide a light emitting control signal, and the first power supply line is configured to provide a first voltage, wherein the light emitting control circuits of pixels located in two adjacent rows share the same light emitting control line;

wherein the light emitting control circuit comprises a light emitting control transistor having a gate, a first electrode and a second electrode, the gate of the light emitting control transistor is electrically connected to the light emitting control line, one of the first electrode and the second electrode of the light emitting control transistor is connected to the first power supply line, and the first power supply line extends in parallel to the light emitting control line;

wherein two adjacent rows of pixels share the same light emitting control transistor;

wherein the first electrodes of the driving transistors of one of the two adjacent rows are connected to the light emitting control transistor through a first connecting line, and the first electrodes of the driving transistors of the other one of the two adjacent rows are connected to the light emitting control transistor through a second connecting line;

wherein the first connecting line comprises a first portion and a second portion, the first portion of the first connecting line extends substantially in parallel to the second connecting line, and the second portion of the first connecting line extends substantially vertical with respect to the second connecting line;

wherein the first electrodes of the driving transistors of the one of the two adjacent rows are connected together through the first portion of the first connecting line and are connected to the light emitting control transistor through the second portion of the first connecting line, and the first electrodes of the driving transistors of the other one of the two adjacent rows are connected together through the second connecting line; and wherein the orthographic projection of the second portion of the first connecting line on the base substrate intersects with the orthographic projection of each of the light emitting control line and the first power supply line connected to the same light emitting control transistor on the base substrate.

2. The display substrate of claim 1, further comprising: a scanning signal line and a data line located on the base substrate, wherein the scanning signal line is configured to provide a scan signal and the data line is configured to provide a data signal;

wherein the light emitting driving circuit comprises a switching transistor, a driving transistor and a capacitor, each of the switching transistor and the driving transistor has a gate, a first electrode and a second electrode, the gate of the switching transistor is connected to the scanning signal line, the first electrode of the switching transistor is connected to the data line, the second electrode of the switching transistor is connected to a first node; the gate of the driving transistor is connected to the first node, the first electrode of the driving transistor is connected to the other of the first electrode and the second electrode of the light emitting control transistor, the second electrode of the driving transistor is connected to a second node; the capacitor is connected between the first node and the second node; an anode of the light emitting element is connected to the second node.

3. The display substrate of claim 1, wherein for two adjacent rows of pixels sharing the same light emitting control transistor, the shared light emitting control transistor is located between the light emitting driving circuits of the two adjacent rows of pixels.

4. The display substrate of claim 1, wherein for two adjacent rows of pixels sharing the same light emitting control transistor, both the light emitting control line and the first power supply line connected to the shared light emitting control transistor are located between the light emitting driving circuits of the two adjacent rows of pixels.

5. The display substrate of claim 1, wherein when the first voltage at a high level and the light emitting control signal at a high level are applied to the plurality of pixels, the plurality of pixels are configured to emit light concurrently with each pixel emitting light at a brightness corresponding to a data signal pre-stored in the each pixel.

6. A display device, comprising the display substrate of claim 1.

7. A method for driving the display substrate of claim 1, the method comprising:

applying a first voltage, a scan signal, a light emitting control signal, and a data signal each having a voltage value of a specified level concurrently to a plurality of pixels, so as to reset the plurality of pixels;

applying a first voltage, a scan signal, a light emitting control signal, and a data signal each having a voltage value of a specified level concurrently to the plurality of pixels, so as to compensate the threshold voltage of the drive transistor in each of the plurality of pixels;

applying a scan signal sequentially to a plurality of rows of pixels, and applying a data signal to the plurality of rows of pixels row by row in response to the sequentially applied scan signal; and applying a first voltage, a scan signal, a light emitting control signal, and a data signal each having a voltage value of a specified level concurrently applied to the plurality of pixels, so as to cause the plurality of pixels to emit light concurrently.

* * * * *